(12) United States Patent  
Davis (10) Patent No.: US 7,441,471 B1
(45) Date of Patent: Oct. 28, 2008

(54) GROUND ANCHOR LOAD TESTING SYSTEM AND METHOD

(76) Inventor: John D. Davis, 7633 Raven Hills Dr., Las Vegas, NV (US) 89149

( * ) Notice: Subject to any disclaimer, the term of this patent is extended or adjusted under 35 U.S.C. 154(b) by 119 days.

(21) Appl. No.: 11/610,398

(22) Filed: Dec. 13, 2006

(51) Int. Cl.
G01L 5/04 (2006.01)
G01L 1/26 (2006.01)
E02D 5/74 (2006.01)
E21D 20/00 (2006.01)

(52) U.S. Cl. ............ 73/862.393; 405/303; 52/157
(58) Field of Classification Search ........ 73/862.393; 405/232–257, 303; 52/155–157
See application file for complete search history.

(56) References Cited

U.S. PATENT DOCUMENTS

| 4,290,245 A | 9/1981 | Pardue, Jr. et al. |
| RE32,076 E | 2/1986 | Dziedzic |
| 4,650,372 A | 3/1987 | Gorrell |
| 4,653,245 A | 3/1987 | Webb |
| 4,742,656 A | 5/1988 | Farmer |
| 4,756,129 A | 7/1988 | Webb |
| 4,996,806 A | 3/1991 | Platz |
| 4,998,849 A | 3/1991 | Summers |
| 5,066,168 A | 11/1991 | Holdeman |
| 5,408,788 A | 4/1995 | Hamilton et al. |
| 5,575,122 A | 11/1996 | Hamilton et al. |
| 5,607,261 A | 3/1997 | Odom et al. |
| 6,216,803 B1 | 4/2001 | Deken |
| 6,412,235 B1 | 7/2002 | Pylant |
| 6,615,554 B2 | 9/2003 | Rupiper |
| 6,641,332 B1 | 11/2003 | Alvarado |
| 6,817,810 B2 | 11/2004 | Jones |
| 6,820,379 B1 | 11/2004 | Krinner et al. |

Primary Examiner—Edward Lefkowitz
Assistant Examiner—Jonathan Dunlap
(74) Attorney, Agent, or Firm—Johannes Schneeberger (57) ABSTRACT

A ground anchor load testing system includes a ground anchoring unit having a bare upper drill shaft portion along and around which a reaction anchor with its hollow shaft is temporary installed. During test loading of the installed ground anchoring unit, a test loading head is coupled with both concentric flanging ends of the ground anchoring unit and the temporarily installed reaction anchor. The test loading head exerts via a first coupling the push test load on the first flanging end of the ground anchoring unit while withholding itself via a second coupling on the second flanging end of the reaction anchor. A measurement device may be positioned on the ground adjacent the test load head. Eventual axial displacement of the ground anchoring unit under test load may be externally recognized by the measurement device via an axial displacement indicator in axial connection with the first coupling.

20 Claims, 6 Drawing Sheets

GROUND ANCHOR LOAD TESTING SYSTEM AND METHOD

FIELD OF INVENTION

The present invention relates to systems and methods for testing an installed ground anchor. In particular, the present invention relates to systems and methods for testing an installed ground anchor by use of a single reaction anchor temporary installed concentrically with respect to the ground anchor.

BACKGROUND OF INVENTION

Ground anchors are increasingly used for residential architectural constructions and other construction projects requiring low cost foundation stabilization. Ground anchors may provide for cost effective stabilization of foundations without requiring expensive excavations and deeply embedded foundations. A variety of prior art ground anchors are employed at the time of this invention, mostly in configurations including helical plates welded to square or round shafts. Such well known ground anchors are commonly installed by drilling them deep into the ground.

A main limitation of utilizing such ground anchors on a larger scale may be the time and space required for test loading of them. After installation, a ground anchor may need to be proof loaded with a predetermined load of several ten thousand pounds. In the prior art such test loads are commonly provided by at least two temporary ground anchors drilled into the ground adjacent the ground anchor under test. In a following step, a heavy beam is hauled onto the test site and fixed on top of the adjacent temporary anchors such that it spans across the to ground anchor under test. By use of well known hydraulic equipment, a push load is then applied on that ground anchor. The push load is transferred by the heavy beam onto the lateral temporary anchors. Any setting of the ground anchor under test loading is measured with reference to the surrounding ground. After successful testing the heavy beam is hauled away again and the temporary anchors screwed out of the ground. A single anchor test performed in such fashion may take several hours to complete and may require additional hauling equipment and a number of additional personnel to haul and install the heavy beam. The hauling and installation of the heavy beam may also impair other construction work performed at the construction site at the same time. Therefore, there exists a need for a method and system of load testing installed ground anchors substantially within the footprint of the ground anchor to be tested and without need of any additional proof load transferring heavy structures such as beams and the like. The present invention addresses this need.

SUMMARY OF INVENTION

A ground anchor load testing system includes a ground anchoring unit having a bare upper drill shaft portion along and around which a reaction anchor with its hollow shaft is temporary installed. To test load the installed ground anchoring unit, a test loading head is coupled with both concentric flanging ends of the ground anchoring unit and the temporarily installed reaction anchor. The test loading head is preferably a hydraulic cylinder assembly that exerts via a first coupling the push test load on the first flanging end of the ground anchoring unit while withholding itself via a second coupling on the second flanging end of the reaction anchor. The ground anchoring unit has one or more push load transferring anchoring structure(s) such as well known helical plate(s) along a bottom portion of the drilling shaft. The reaction anchor features one or more pull load ground transferring anchoring structure(s) along the hollow shaft. The pull load ground transferring anchoring structure(s) may be helical plate(s) placed along the hollow shaft in proximity of the anchoring unit's bottom end and may have a minimum diameter selected in conjunction with an approximated ground shear angle and an approximated specific weight of the surrounding ground such that sufficient pull load resistance of the ground is warranted during test loading of the ground anchoring unit. A ground referencing axial displacement measurement device may be positioned on the ground adjacent the attached test load head. Eventual axial displacement of the ground anchoring unit under test load may be externally accessibly referenced by an axial displacement indicator in axial connection with the first coupling. The axial ground anchor displacement may be externally picked up from the displacement indicator by the measurement device, which may include a caliper or a laser. Alternately, the displacement indicator may be a laser emanating a beam impinging on the measurement device.

The ground anchoring unit may include a separate ground anchor and an extension at least axially push rigidly and rotationally rigidly combinable via an anchor coupling. In that case, the extension may provide the bare upper shaft portion. The anchor coupling may have an outer coupling diameter that is at least equal to the diameter of the reaction anchor's hollow shaft. During drill installation of the ground anchor and extension, the anchor coupling may thus radially widen the ground away from the bare upper portion. As a result, the hollow shaft may slide over the bare upper portion substantially unimpeded by the ground while the reaction anchor is drilled into the ground.

The concentric temporary installation of the single reaction anchor provides for a direct coupling of the test loading head with the reaction anchor and the ground anchoring unit under test. The bare upper shaft portion extending out of the ground serves favorably as a centering aid for easy positioning of the reaction anchor prior to drill installation. The load testing procedure is easy and fast to perform without any additional equipment. Optionally, the reaction anchor may be simultaneously drilled into the ground together with the ground anchoring unit.

DETAILED DESCRIPTION

Figure 1:
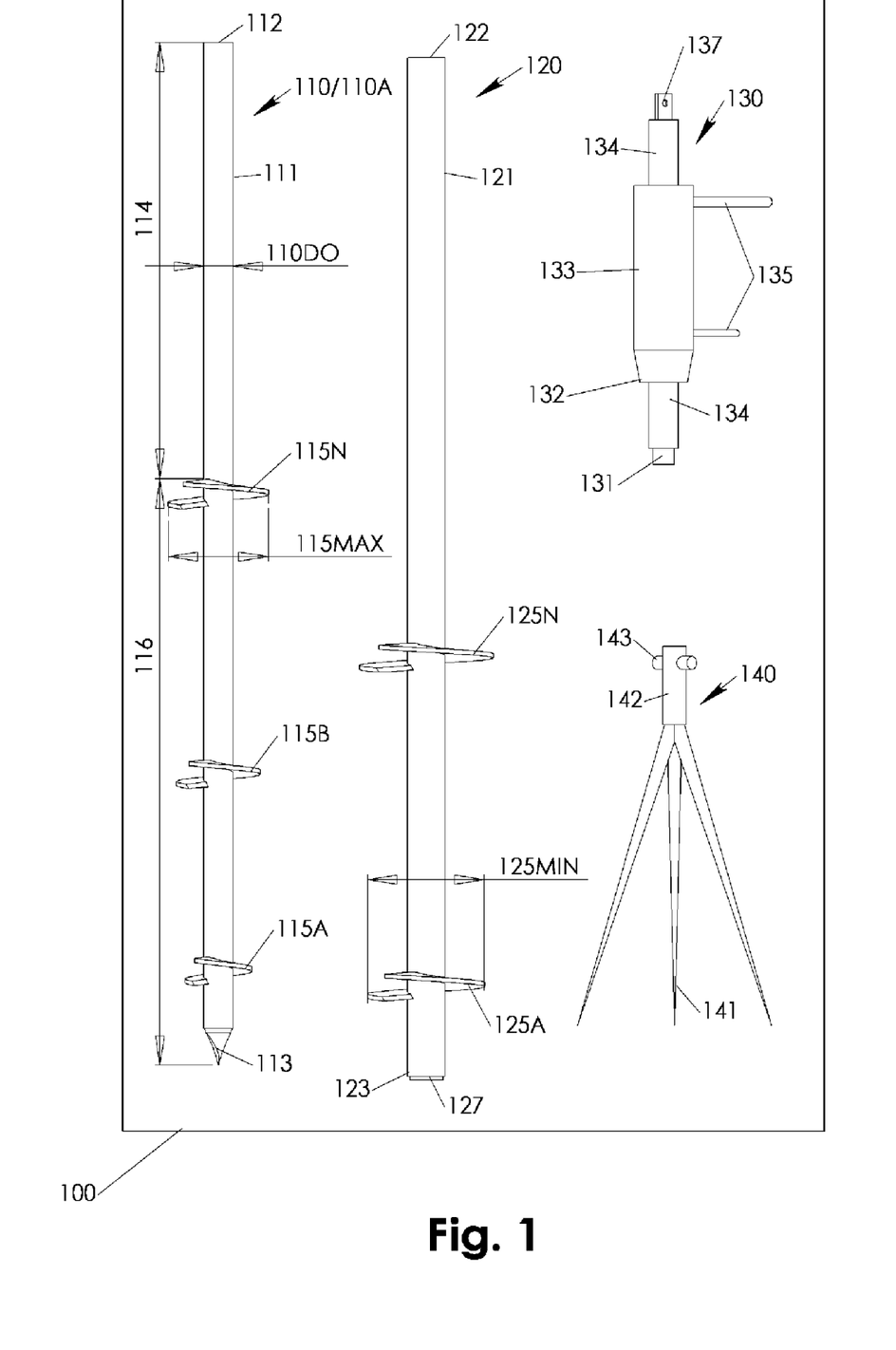
FIG. 1 depicts a first basic embodiment of the ground anchor load testing system of the present invention.
Figure 2:
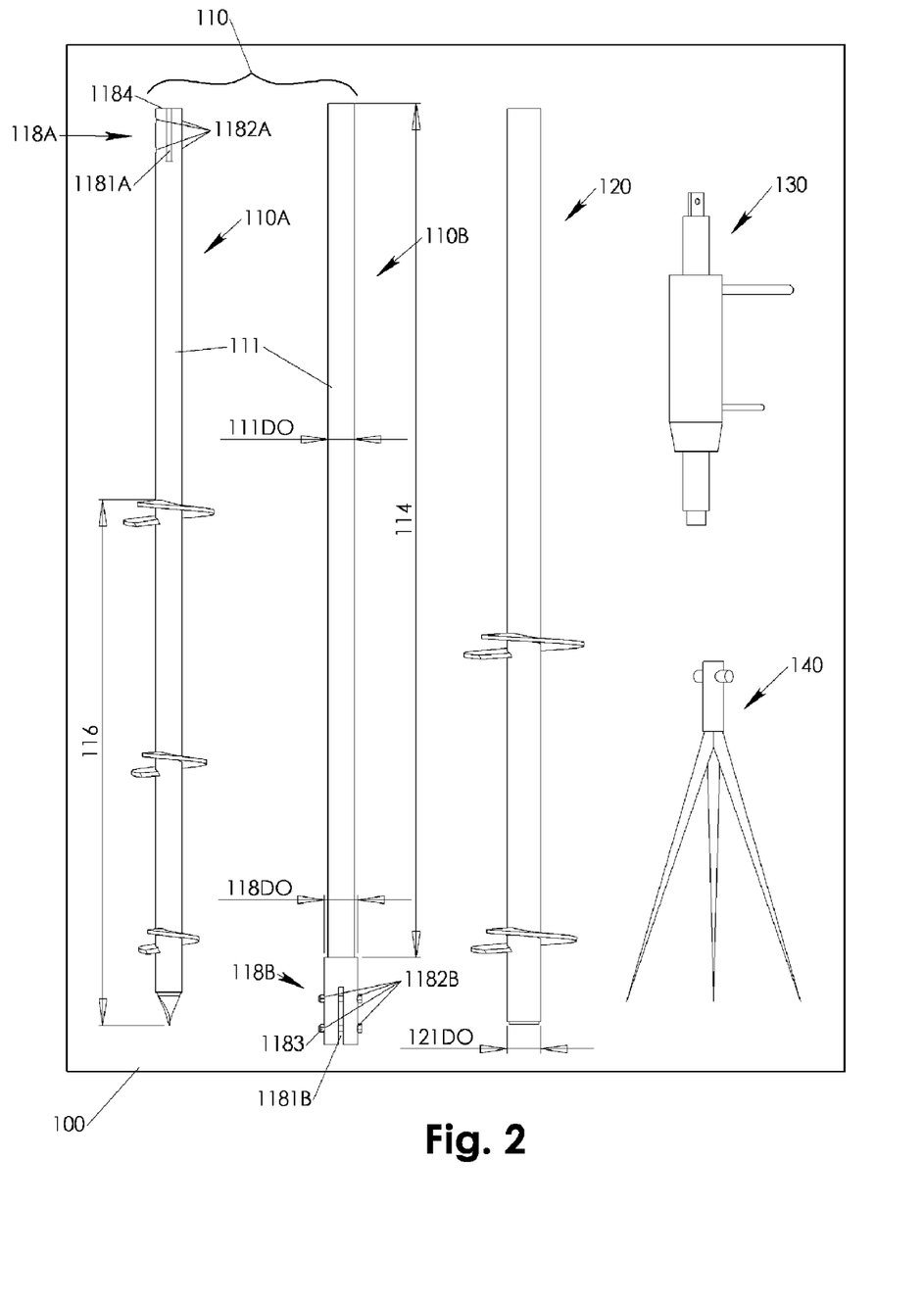
FIG. 2 depicts a second embodiment of the ground anchor load testing system.
Figure 3:
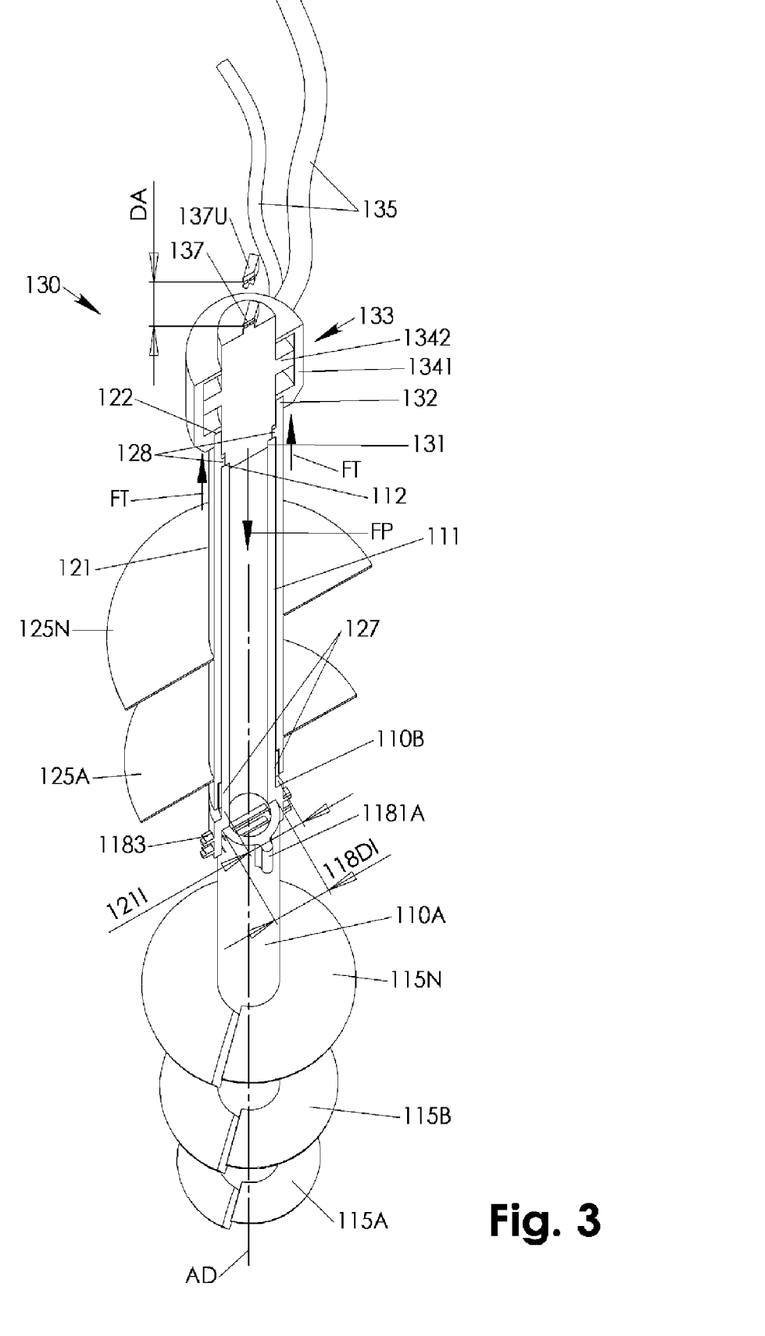
FIG. 3 is the top perspective view of the assembled ground anchoring unit of FIG. 2, as well as reaction anchor and test loading head of FIGS. 1 and 2. Extension, reaction anchor and test loading head are depicted as being cut along a plane coinciding with the drill axis.

Referring to FIGS. 1-3, a ground anchor load testing system 100 may include a ground anchoring unit 110, a reaction anchor 120, a test loading head 130 and a ground referencing axial displacement measurement device 140. The ground anchoring unit 110 preferably includes a ground anchor 110A and an optional extension 110B. A drilling shaft 111 of the ground anchoring unit 110 has a drilling end 113, a first flanging end 112, a bare upper portion 114 adjacent the first flanging end 112 and a bottom portion 116 adjacent the drilling end 113. The bottom portion 116 features one or more push load ground transferring anchoring structure(s) 115A-N in the preferred configuration of helical plate(s). The primary helical plate(s) 115A-N may have a primary maximum diameter 115MAX, which in case of multiple helical plates 115A-N may be the diameter of the helical plate 115N furthest away from the drilling end 113.

In case of an additionally employed extension 110B, the ground anchor 110A may feature the bottom portion 116 and the drilling end 113. The extension 110B may feature the bare upper portion 114 and the first flanging end 112. A shaft coupling 118A, 118B combines at least axially push rigidly and rotationally rigidly the ground anchor 110A and the extensions 110B. A first shaft coupling portion 118A may feature longitudinal spline members 1181A welded on the outer circumference of the drilling shaft 111 and protruding longitudinally with respect to the drilling axis AD. A second shaft coupling portion 118B may have an outer coupling diameter 118DO and an inner coupling diameter 118DI sufficiently large such that the second shaft coupling portion 118B may conveniently slide over the drilling shaft 111 at the coupling end 1184. The second shaft coupling portion 118B may feature a longitudinal spline slot(s) 1181B corresponding to the longitudinal spline member(s) 1181A. Both shaft coupling portions 118A, 118B feature at least one but preferably two transverse clamping holes 1182A,B, which are in alignment while the two shaft coupling portions 118A,B are coupled. Transverse clamping fasteners 1183 may extend through the aligned clamping holes 1182A,B clamping and locking the shaft coupling 118A,B.

Figure 4:
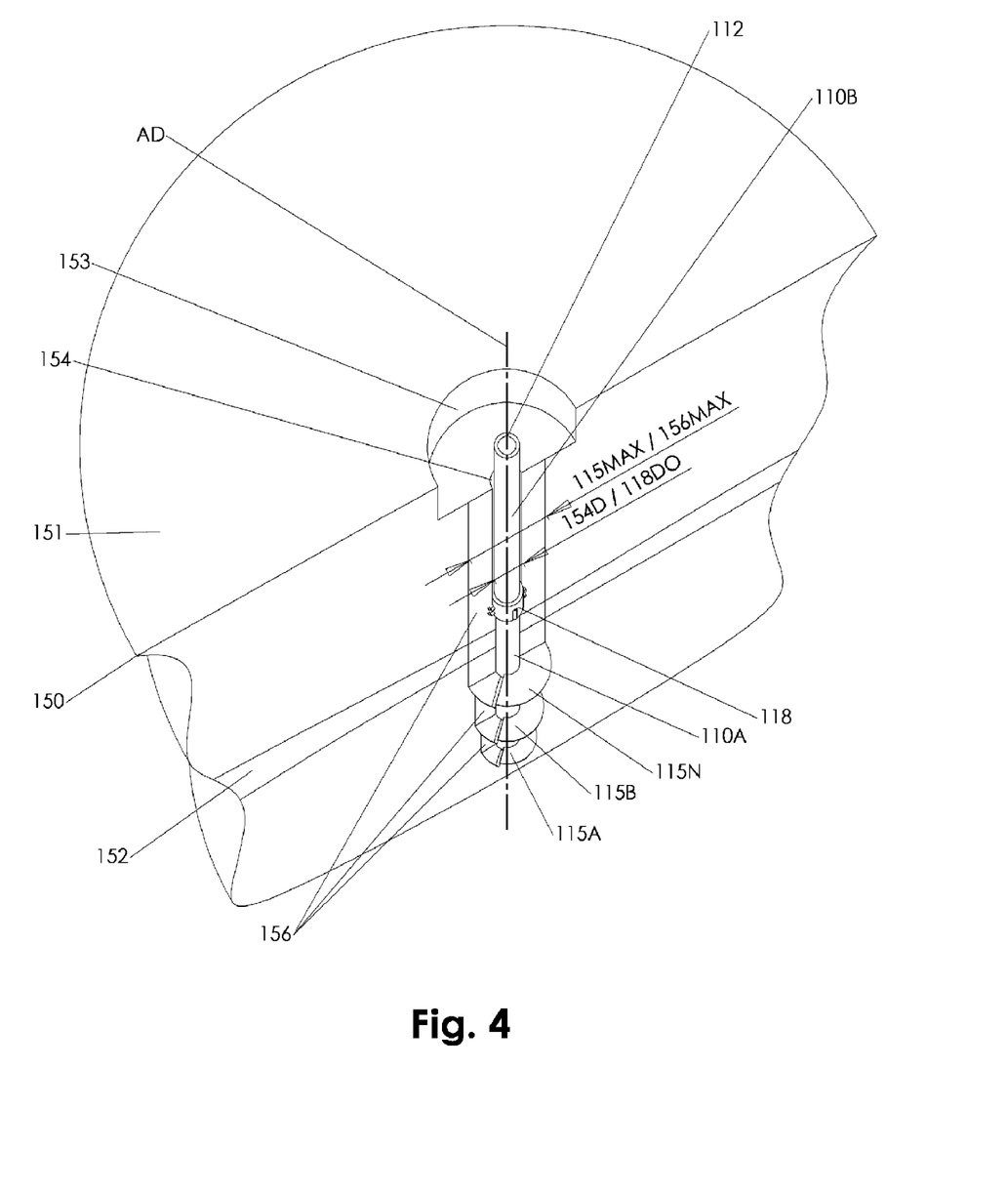
FIG. 4 shows a top perspective view of a ground section cut along a plane coinciding with the drill axis of the ground anchoring unit of FIGS. 2 and 3 in ground installed condition.

Referring additionally to FIG. 4, the shaft coupling 118A,B preferably has an outer coupling diameter 118DO that is at least equal to an outer hollow shaft diameter 121DO. The shaft coupling 118A,B radially widens the ground 150 away from the bare upper portion 114 while the ground anchoring unit 110 is drilled into the ground creating the widened ground core 154 having a core diameter 154D. Consequently, the hollow shaft 121 may slide over the bare upper portion 114 substantially unimpeded by the ground 150 while the reaction anchor 120 is drilled into the ground 150 with the ground anchoring unit 110 being previously ground installed.

Figure 5:
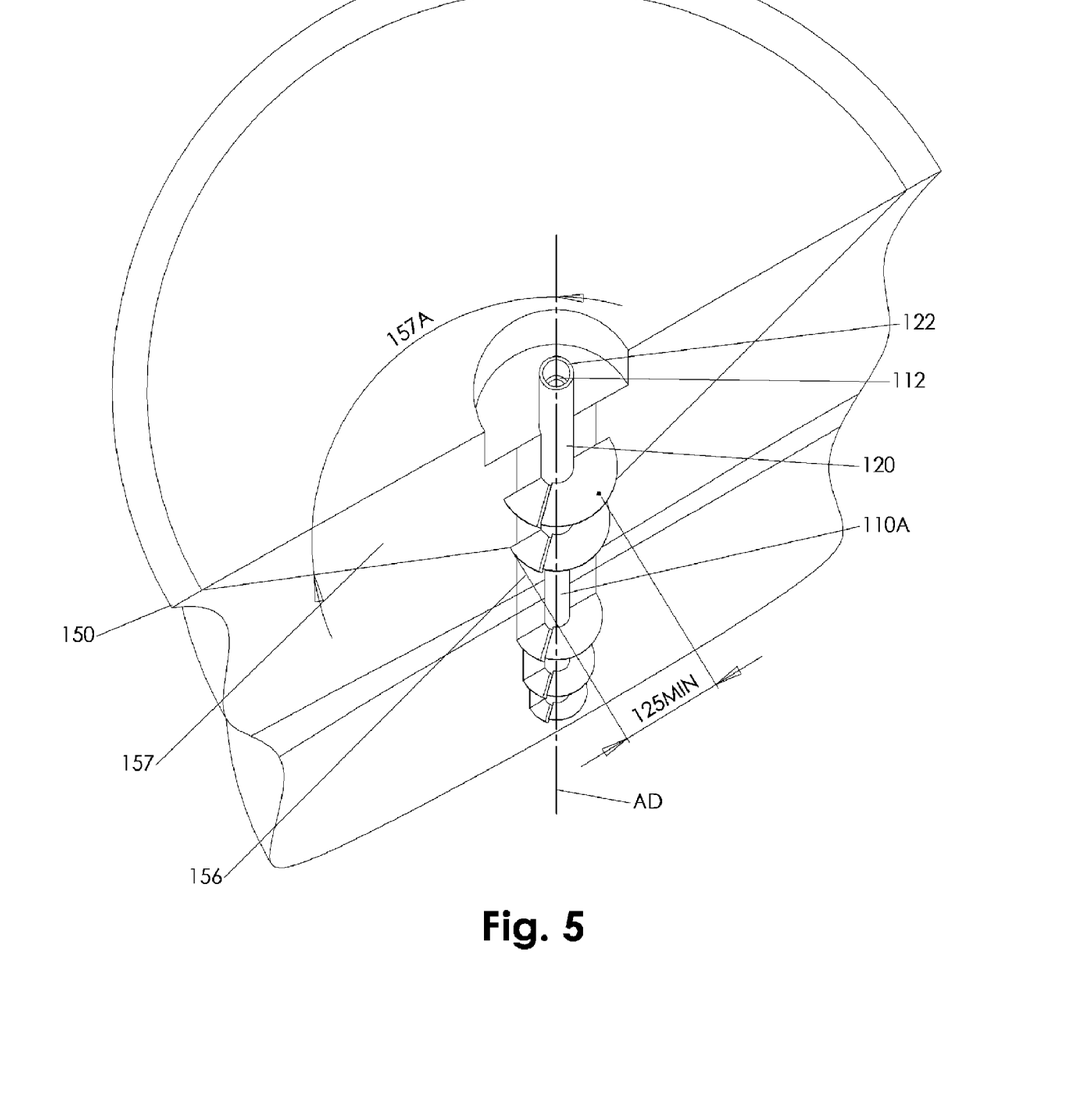
FIG. 5 is similar to FIG. 4 with additionally temporary installed reaction anchor of FIGS. 1, 2 and 3.

The reaction anchor 120 has a hollow shaft 121 fitting around and along the bare upper portion 114. The reaction anchor has a second flanging end 122 and one or more pull load ground transferring anchoring structure(s) in the preferred configuration of secondary helical plate(s) 125A-N having a secondary minimum diameter 125MIN. The hollow shaft 121 is preferably loosely rotatably and axially fitting around and along the bare upper portion 114 such that the reaction anchor 120 may be drill installed concentrically guided with respect to the bare upper portion 114 of the ground anchoring unit 110 in a ground installed condition as depicted in FIG. 5.

One or both of the bare upper portion 114 and/or the hollow shaft 121 may be substantially cylindrical. In case of a cylindrical bare upper portion 114, a minimum inner diameter 121DI of the hollow shaft 121 is larger than an outer bushing diameter 111DO of the bare upper portion 114. In case of cylindrical hollow shaft 121, the inner diameter 121DI is an inner bushing diameter 121DI and the outer diameter 111DO fulfills the minimum requirement of being smaller than the inner bushing diameter 121 DI. Nevertheless, both drilling shaft 111 and hollow shaft 121 are preferably cylindrical.

The test loading head 130 includes a first coupling 131 that is at least axially push rigidly fitting on the first flanging end 112, which means that the first coupling 131 may transmit a push load FP generated by the test loading head 130 onto the first flanging end 112 when coupled together. Also part of the test loading head 130 is a second coupling 132 that is at least axially pull rigidly fitting on the second flanging end 122, which means that the second coupling 132 may transmit a pull load FT resulting from the generated push test load FP. The push load FP may be generated for the purpose of test loading the ground installed ground anchoring unit 110 in accordance with well known proof load criteria. The pull load FT may be a reaction load counteracting and balancing out the push load FP as may be well appreciated by anyone of average skills in the art.

First coupling 131 and first flanging end 112 as well as second coupling 132 and second flanging end 122 may be coupled by well known structural elements such as two complementary inside and outside threads as is well known in the art. Additional axial shoulder(s) and complementary flanges may be incorporated as may seem fit in accordance with well established design criteria for structural axial couplings. In additional embodiment, the first coupling 132 may be configured as an arbor that radially loosely fits onto the first flanging end 112 such that push force FP may be transmitted irrespective an eventual radial misalignment between bare upper portion 114 and hollow shaft 121.

Further part of the test loading head 130 is a loading unit combined with the first coupling 131 and the second coupling 132. The first coupling 131 is axially displace able with respect to the second coupling 132 while the push load FP is created by the loading unit 133 and transferred via the first coupling and the drilling shaft 111 onto the push load ground transferring anchoring structure(s) 115A-N. At the same time, the resulting pull load FT also created by the loading unit 133 is transferred via the second coupling 132 and the hollow shaft 121 onto the pull load ground transferring anchoring structure(s) 125A-N. The push load FP and the pull load FT are acting in substantially opposing direction and axially with respect to the drilling shaft 111 and the hollow shaft 121. It is noted that due to the concentric occurrence of the central push load FP and the surrounding pull load FT, the pull load FT is indicated in FIG. 3 as two arrows on both sides of the push load FP arrow.

Preferably, the test loading head 130 may be externally structurally connected primarily with the first flanging end 112 via the first coupling 131 and with the second flanging end 122 via the second coupling 132. Push load FP and the pull load FT are thereby substantially canceling each other out. As a favorable result additional space and time consuming temporary test structure installations may be avoided.

The loading unit 133 may be preferably configured as a well known hydraulic cylinder assembly 133 as depicted in the Figures, and may include a cylinder housing 1341 and a piston 1342. The cylinder housing 1341 may be structurally combined with the first coupling 131 and the piston 1342 may be structurally combined with the second coupling 132. Well known hydraulic line(s) 135 may provide and/or circulate well known energized hydraulic fluid to the hydraulic cylinder assembly 133 as may be well appreciated by anyone skilled in the art.

Also part of the test loading head 130 is an axial displacement indicator 137 in axial connection with the first coupling 131. The axial displacement indicator 137 externally accessibly references an axial ground anchor displacement DA of the drilling shaft 111 while the push load FP is transferred onto the drilling shaft. FIG. 3 shows how the axial ground anchor displacement DA is correlated to the push load FP. After the ground anchoring unit 110, the reaction anchor 120 and the test loading head 130 are installed, the axial displacement indicator 137 may be in its load free indicator position 137 while no push load FP is applied. During load testing, a predetermined push load FP may be exerted on the ground anchoring unit 110 via the piston unit 1342 causing the ground anchoring unit 110 to be displaced downwards. The displacement of the ground anchoring unit 110 along its drilling axis AD is transmitted across the piston unit 1342 and manifested in the axial ground anchor displacement DA irrespective eventual opposite reaction movement of the reaction anchor 120 under pull load FT.

Figure 6:
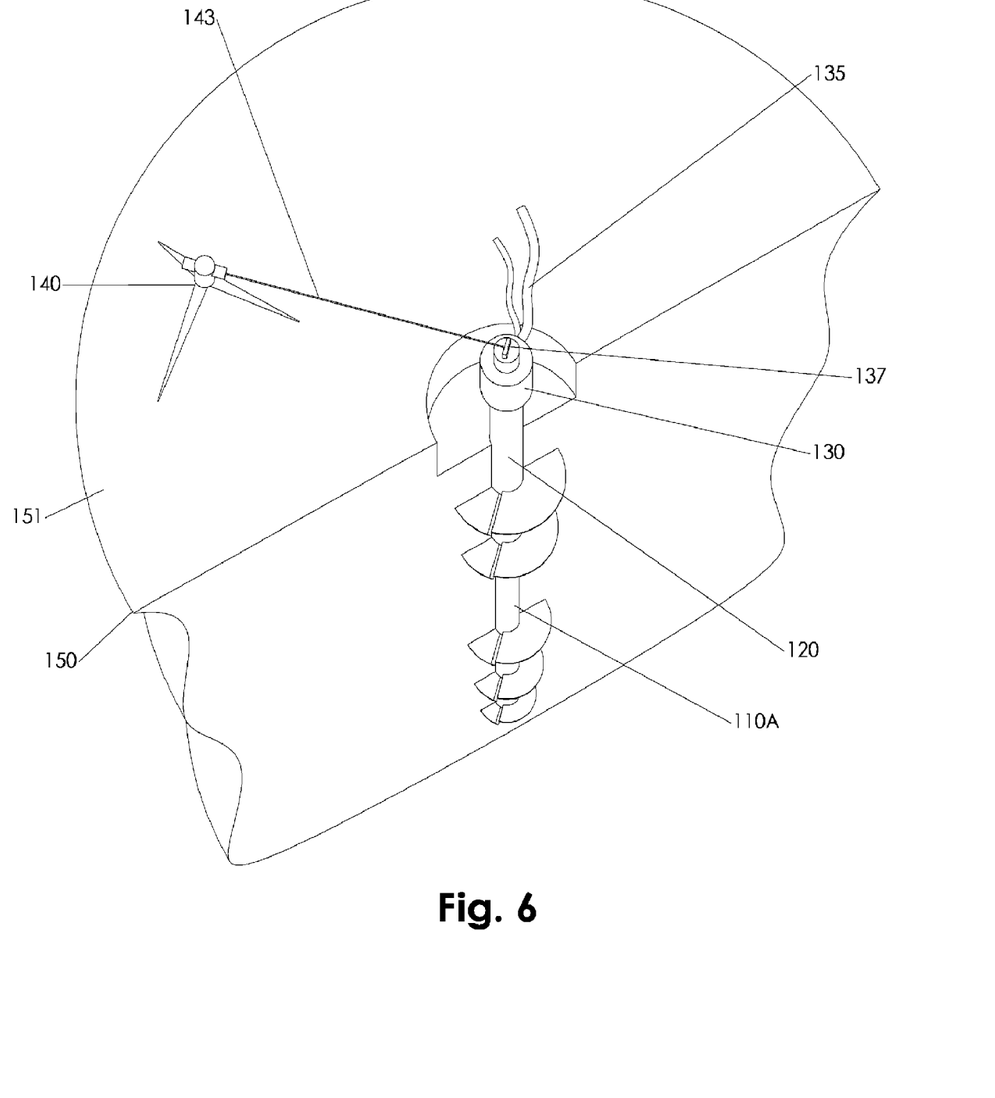
FIG. 6 is similar to FIG. 5 with additionally assembled test loading head of FIGS. 1, 2, 3 and positioned ground referencing axial displacement measurement device of FIGS. 1, 2.

Referring also to FIG. 6, the axial ground anchor displacement DA may be recognized with respect to the ground 150 by a ground referencing axial displacement measurement device 140. The measurement device 140 has a ground contacting base 141 and an axial displacement recognition unit 142 combined with the ground contacting base 141. The axial displacement recognition unit 142 may include a mechanical displacement measurement device such as a well known caliper or the like. With the caliper, the axial ground anchor displacement DA may be measured by physically contacting the axial displacement indicator 137 as may be well appreciated by anyone skilled in the art.

The axial displacement recognition unit 142 may also include a laser device. In such embodiment, the axial displacement indicator 137 may be configured as a scale axially extending at least equal to a maximum predetermined distance of the axial ground anchor displacement DA. In that case, the scale 137 displays the axial ground anchor displacement DA in combination with an impinging laser beam 143 emanated by the laser device 142 as may be well appreciated by anyone skilled in the art. Alternately, the laser 142 may be part of or attached to the axial displacement indicator 137 and the scale may be part of or attached to the axial displacement recognition unit 142.

The hollow shaft 121 may include a sacrificial internal lining 127 extending inside the hollow shaft 121. The sacrificial internal lining 127 is of a hardness substantially lower than the bare upper portion 114 such that abrasion of the bare upper portion 114 is substantially prevented while the reaction anchor 120 is drilled into the ground 150 and while the hollow shaft 121 is axially guided and sliding along the bare upper portion 114 of the previously ground installed ground anchoring unit 110. The sacrificial internal lining 127 may be preferably a bushing ring preferably made of a plastic material such as a well known polyamide plastic and inserted in the hollow shaft 121 at the bottom end 123.

Referring to FIG. 4 and in case of employed primary helical plates 115A-N the ground anchoring unit 110 is drill installed in the ground 150 as may be well appreciated by anyone skilled in the art. A well known pilot hole 153 may be dug into the ground 150 prior to the ground anchor installation. The pilot hole 153 may serve to remove loose top soil and/or to cast the top portion of the ground anchoring unit 110 in concrete for radial fixing after testing and removal of the reaction anchor 120.

During drill installation, the primary helical plate(s) 115A-N propagate downwards while rotating around the drill axis AD. Nevertheless, the present invention may include embodiments in which the push load ground transferring structures 115A-N are other well known structures suitable for their prescribed purpose. Also, the present invention may include embodiments in which the ground anchoring unit 110 is installed other than by drilling, such as by hammering.

To account for eventual hardened sediment layer(s) 152 well known as calichie, a hardened steel tip may be present at the drilling end 113 and the primary helical plates 115A-N may be stacked with increasing diameters in direction away from the drilling end 113. in such a configuration, the plates 115A-N widen the plate penetrating ground core 156 in gradual steps up to a maximum penetration diameter 156MAX as the hardened sediment layer 152 is penetrated. As a favorable result, the ground anchoring unit 110 may be drill installed down to a predetermined depth at which the ground 150 density is sufficient to support the primary helical plates 115A-N. Due to gradual diameter increase of the primary helical plates 115A-N the peak torque required to break through the hardened sediment layer(s) 152 may be kept low as may be well appreciated by anyone skilled in the art. There may be more than one extension 110B employed, in case of which the bare upper portion 114 is that of the extension 110B closest to the ground surface 151.

Referring to FIG. 5 and following the ground installation of the ground anchoring unit 110, the reaction anchor 120 may be drill installed by placing its bottom end 123 over the first flanging end 112. The bare upper portion 114 may provide axial guiding to the reaction anchor 120. Then, the reaction anchor 120 may also be drill installed along the height of the bare upper portion 114. The widened ground core 154 may substantially reduce ground material being pushed into the gap between the outer hollow shaft 121 and the drilling shaft 111. The optional sacrificial inner lining 127 may additionally assist in preventing scratching of the bare upper portion 114. This may be particularly favorable in cases in which the bare upper portion 114 is surface coated to prevent corrosion.

The secondary minimum diameter 125MIN may preferably be substantially larger than the primary maximum diameter 115MAX such that the secondary helical plates 125A-N reach laterally beyond the boundaries of the plate penetrated ground core 156. This may be of particular value to provide direct pull load ground transfer unimpeded by the eventually loosened plate penetrated ground core 156. A maximum pull load FT transferred from the secondary helical plates 125A-N may depend among other factors on the installation depth of the lowest helical plate 125A, the ground shear angle 157A and the minimum secondary diameter 125MIN. These three elements may define a ground frustrum 157. The mass of the ground frustrum 157 may be representative for the maximum pull load FT as may be well appreciated by anyone skilled in the art.

Once the reaction anchor 120 is installed, the test loading head 130 may be installed on both flanging ends 112, 122 and the hydraulic lines 135 connected to a pump and other well known equipment eventually needed to operate the test loading head 130 in a well known fashion. After placing and eventually calibrating the ground referencing axial displacement measurement device 140, the ground referenced measuring of the axial ground anchor displacement DA may be performed according to well known ground anchor testing standards while the push load FP is applied. After test loading and measuring the test loading head 130 may be removed again and the reaction anchor 120 screwed out of the ground. The push load ground transferring anchoring structures 115A-N are substantially below the ground frustrum 157. The operational and testing push loads FP are transferred downwards and away from the ground frustrum 157. Consequently, eventual ground loosening within and/or in the proximity of the ground frustrum 157 during test loading may not adversely affect the load carrying capacity of the installed ground anchoring unit 110. The ground anchoring unit 110 and the reaction anchor 120 may be optionally concurrently drill installed in the ground 150.

In a preferred embodiment of the invention, the drilling shaft 111 is made from API G-55 grade drill rod having an outer tubing diameter 110DO of about 3½ inches with about ½ inch wall thickness. The drilling tip may be of dual hardness and welded with its softer flange onto the drilling shaft 111. The primary helical plates 115A-N may be of ½ inch sheet metal with a diameter between 6-24 inches for ground materials ranging between rocky ground composition and sandy ground composition. The reaction anchor 120 may be of API G-55 grade drill rod having an outer diameter 121DO of about 4½ inches with slightly less than ½ inch wall thickness. The secondary helical plates 125A-N may be of ½ inch sheet metal with a diameter between 8-26 inches following a preferred 2 inch diameter. The ground anchor 110A and the extension 110B may be 10 feet long each. A drilling head employed for drill installing the ground anchor unit 110 and the reaction anchor 120 may have a maximum torque output of 35000 footpounds. The helical plates 115A-N and 125A-N may be made of hotrolled ASTM-ASME A36 grade ⅝" thick.

For axial positioning of the second flanging end 122 with respect to the first flanging end during installation of the reaction anchor 120, an optional internal drill stop flange 128 (see FIG. 3) may be radially inward extend from the hollow shaft 121. The internal drill stop flange 128 has an inner diameter that is smaller than the outer diameter of the first flanging end 112. As the reaction anchor 120 is drilled in the ground, the drill stop flange 128 may contact the first flanging end 112 blocking a further drilling of the reaction anchor 120. At that moment a sharp rise in the drilling torque may occur as an indicator that the reaction anchor 120 is at its predetermined axial position with respect to the ground anchoring unit 110. The first coupling 131 may be accordingly configured to provide sufficient clearance to the internal drill stop flange 128.

A practical test performed with a ground anchoring unit 110 having three helical plates 115A-N with diameters of 8, 10, and 12 inches and a reaction anchor 120 having three helical plates 125A-N with diameters of 14, 12 and 10 inches was performed. At ground 150 conditions where during a testing load of 97500 lbs the first flanging end 112 moved towards the ground 150 about 1.325 inches, the second flanging end 122 moved away from the ground 150 about 1.695 inches. A maximum proof load of 105000 lbs was successfully opposed by the reaction anchor 120. The maximum torque during installation of the reaction anchor 120 was 28000 footpounds. The reaction anchor 120 was installed about 8 feet into the ground 150. The drill installation of the reaction anchor 120 took about 5 minutes.

Accordingly, the scope of the invention described in the Figures and the Specification above is set forth by the following claims and their legal equivalents:

What is claimed is:
1. A ground anchor load testing system comprising:
 a. A ground anchoring unit including an drilling shaft including:
  i. a first flanging end;
  ii. a drilling end;
  iii. a bare upper portion adjacent said first flanging end; and
  iv. a bottom portion adjacent said drilling end, said bottom portion featuring a push load ground transferring anchoring structure;
 b. A reaction anchor including a hollow shaft fitting around and along said bare upper portion, said hollow shaft including:
  i. A second flanging end;
  ii. A pull load ground transferring anchoring structure;
 c. A test loading head including:
  i. a first coupling that is at least axially push rigidly fitting on said first flanging end;
  ii. a second coupling that is at least axially pull rigidly fitting on said second flanging end;
  iii. a loading unit combined with said first coupling and said second coupling such that said first coupling is axially displace able with respect to said second coupling while:
   1. said push load is created by said loading unit and transferred via said first coupling and said drilling shaft onto said push load ground transferring anchoring structure;
   2. said pull load is created by said loading unit and transferred via said second coupling and said hollow shaft onto said pull load ground transferring anchoring structure;
   wherein said push load and said pull load are acting in substantially opposing direction and axially with respect to said drilling shaft and said hollow shaft;
  iv. an axial displacement indicator in axial connection with said first coupling, said axial displacement indicator externally accessibly references an axial ground anchor displacement of said drilling shaft while said push load is said transferred onto said drilling shaft, said axial ground anchor displacement being correlated to said push load; and
 d. A ground referencing axial displacement measurement device including:
  i. A ground contacting base;
  ii. An axial displacement recognition unit combined with said ground contacting base,
 such that said axial ground anchor displacement is recognized with respect to said ground by said ground referencing axial displacement recognition device.

2. The ground anchor load testing system of claim 1, wherein said hollow shaft is loosely rotatably and axially said fitting such that said reaction anchor may be drill installed concentrically guided with respect to said bare upper portion of said ground anchoring unit in a ground installed condition.

3. The ground anchor load testing system of claim 1, wherein said bare upper portion is substantially cylindrical and has an outer bushing diameter, and wherein said hollow shaft has a minimum inner diameter larger than said outer bushing diameter.

4. The ground anchor load testing system of claim 1, wherein said hollow shaft is substantially cylindrical and has an inner bushing diameter, and wherein said drilling shaft has a maximum outer diameter smaller than said inner bushing diameter.

5. The ground anchor load testing system of claim 1, wherein said test loading head is primarily externally structurally connectable with said first flanging end via said first coupling and with said second flanging end via said second coupling, and wherein said push load and said pull load are substantially canceling each other out.

6. The ground anchor load testing system of claim 1, wherein said ground anchoring unit includes:
   a. a ground anchor featuring said bottom portion and said drilling end;
   b. an extension featuring said bare upper portion and said first flanging end;
   c. a shaft coupling combining substantially at least axially push rigidly and rotationally rigidly said ground anchor and said extension.

7. The ground anchor load testing system of claim 6, wherein said shaft coupling has an outer coupling diameter that is at least equal to an outer hollow shaft diameter such that said shaft coupling radially widens said ground away from said bare upper portion while said ground anchoring unit is drilled into said ground and such that said hollow shaft slides over said bare upper portion substantially unimpeded by said ground while said reaction anchor is drilled into said ground with the ground anchoring unit being previously ground installed.

8. The ground anchor load testing system of claim 1, wherein said hollow shaft includes a sacrificial internal lining extending inside said hollow shaft, said sacrificial internal lining being of a hardness substantially lower than said bare upper portion such that abrasion of said bare upper portion is substantially prevented while said reaction anchor is drilled into said ground and while said hollow shaft is axially guided and sliding along said bare upper portion.

9. The ground anchor load testing device of claim 8, wherein said sacrificial internal lining is a bushing ring inserted in said hollow shaft at an end opposite said second flanging end.

10. The ground anchor load testing device of claim 8, wherein said internal lining is a plastic material.

11. The ground anchor load testing device of claim 10, wherein said internal lining is a polyamide plastic.

12. The ground anchor load testing system of claim 1, wherein said pull load ground transferring anchoring structure includes a primary helical plate.

13. The ground anchor load testing system of claim 12, wherein said push load ground transferring anchoring structure includes a primary helical plate having a primary maximum diameter and wherein said secondary helical plate has a secondary minimum diameter being substantially larger than said primary maximum diameter.

14. The ground anchor load testing system of claim 1, wherein said axial displacement recognition unit includes a mechanical displacement measurement device.

15. The ground anchor load testing system of claim 1, wherein said axial displacement recognition unit includes a laser device and wherein said axial displacement indicator is configured as a scale axially extending at least a maximum predetermined distance of said axial ground anchor displacement such that said scale displays said axial ground anchor displacement in combination with an impinging laser beam emanated by said laser device.

16. The ground anchor load testing system of claim 1, wherein said axial displacement indicator includes a laser device and wherein said axial displacement recognition unit is configured as a scale axially extending at least a maximum predetermined distance of said axial ground anchor displacement such that said scale displays said axial ground anchor displacement in combination with an impinging laser beam emanated by said laser device.

17. The ground anchor load testing system of claim 1, wherein said hollow shaft further comprises an internal drill stop flange having an inner diameter smaller than an outer diameter of said first flanging end, such that a drill installation of said reaction anchor is axially limited by a contacting of said internal drill stop flange with said first flanging end.

18. A method for load testing an installed ground anchor, said method comprising the steps of:
   a. providing a ground anchor unit with a push load ground transferring anchoring structure and a bare upper shaft portion;
   b. providing a reaction anchor drill installable concentrically around and axially along said bare upper shaft portion;
   c. installing said ground anchor unit;
   d. drill installing said reaction anchor concentrically around and axially along said bare upper shaft portion;
   e. push load testing said installed ground anchor unit via a reaction pull loading of said installed reaction anchor; and
   f. ground referenced measuring an axial ground anchor displacement correlated to said push load testing.

19. The method of claim 18, whereby said installing of said step b) is a drill installing.

20. The method of claim 19, whereby said step c) and d) are concurrently performed.

* * * * *